No. 715,811. Patented Dec. 16, 1902.
W. B. JOHNSON.
COUNTER STIFFENER FOR BOOTS OR SHOES.
(Application filed Apr. 24, 1902.)

(No Model.)

Witnesses
Edward S Day
Alfred H. Hildreth

Inventor
Welcome B. Johnson
by his Attorneys
Phillips, Van Everen & Fish

UNITED STATES PATENT OFFICE.

WELCOME B. JOHNSON, OF CAMBRIDGE, MASSACHUSETTS.

COUNTER-STIFFENER FOR BOOTS OR SHOES.

SPECIFICATION forming part of Letters Patent No. 715,811, dated December 16, 1902.

Application filed April 24, 1902. Serial No. 104,456. (No model.)

*To all whom it may concern:*

Be it known that I, WELCOME B. JOHNSON, a citizen of the United States, residing at Cambridge, in the county of Middlesex and State of Massachusetts, have invented certain new and useful Improvements in Counter-Stiffeners for Boots or Shoes; and I do hereby declare the following to be a full, clear, and exact description of the invention, such as will enable others skilled in the art to which it appertains to make and use the same.

The present invention relates to an improved counter-stiffener for use in the manufacture of boots and shoes.

The object of my invention is to produce counter-stiffeners made of a plurality of layers of material which shall be more uniform as to outline, skiving, and resiliency than prior built-up counters of which I am aware, and which shall at the same time by virtue of the shape and size of the pieces of which it is made be capable of being manufactured by comparatively unskilled labor at a less cost than has heretofore been possible.

To the above ends the present invention consists in the improved counter-stiffener hereinafter described and claimed.

Figure 1:
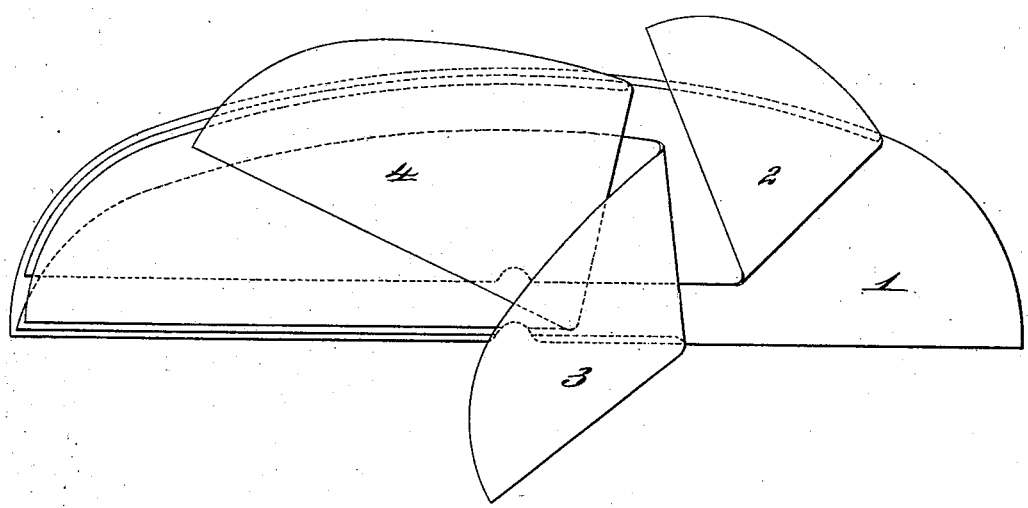
Figure 2:
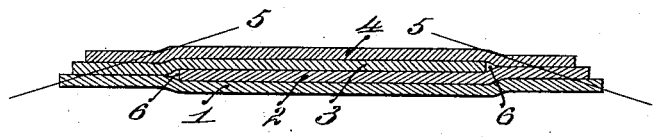
Figure 3:
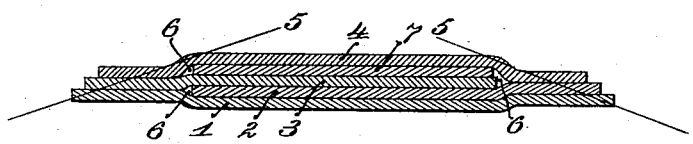

In the accompanying drawings, illustrating the preferred form of my invention, Figure 1 is a plan of one form of my improved counter, showing the several layers thereof folded back to disclose the construction and arrangement of its parts. Fig. 2 is a diagrammatic cross-section of the same, and Fig. 3 is a diagrammatic cross-section of a modified form.

Referring to the accompanying drawings, the outside layer 1 is died out of a piece of leather or other suitable material of proper thickness and of the shape desired in the finished article. A second layer 2, slightly shorter than the outside layer and considerably narrower than such layer, is coated upon one side with cement and laid upon the outside layer with one of its lateral edges located adjacent to one of the lateral edges of the outside layer. In the illustrated embodiment of my invention this layer 2 is located upon the outside layer 1 with its curved edge lying adjacent to the curved edge of the outside piece, to which edge it closely approximates in shape. This is an important feature of my invention, as by virtue thereof the workman will lay the second layer upon the outside layer, using the curved edge of the latter as a guide or gage by which he can accurately locate the second layer upon the outside layer. A third layer 3, preferably of the same size and shape as the second layer, having been coated with a layer of cement, is laid upon the outside and second layers with its straight lateral edge lying adjacent to the straight lateral edge of the outside layer, which thereby becomes in like manner a guide or gage to assist the operator in laying this layer upon the other two layers. An inside layer 4, of a size preferably slightly shorter and slightly narrower than the outside layer, having been coated with cement is next laid upon the other three layers, the edges of said layers forming a guide or gage to assist the operator in accurately positioning this inside layer thereupon.

By reference to Fig. 2, showing a diagrammatic cross-section of a counter built up as above described, it will be seen that the lines of skiving 5, to which the counter is subjected after it has been put through the usual pressing-rollers, are not liable to cut into the spaces or openings 6 at the edges of the intermediate layers and that the material removed by the skiving is insignificant in amount. These are important features of my invention, as I am enabled to reduce the waste to a minimum by this means, thereby effecting an important saving in materials employed, and the absence of liability to cut into the spaces 6 at the edges of the intermediate layers secures uniformity in the shape of the skived edges of the counter, whereby the value of the product is much enhanced.

In order to increase the stiffness of the counter, I contemplate employing an additional intermediate layer of material 7, considerably shorter and considerably narrower than the second and third layers 2 and 3, and which may be inserted between the outside layer 1 and the inside layer 4 between any two of the layers. I prefer that this additional intermediate layer of material may be of such a width that its edges will lie adjacent to the edges of the second and third layers, which are the more distant from the edges of the outside layer—that is to say, I locate this additional intermediate layer approximately in the middle of the counter-stiffener. The ends of this additional layer may extend to the ends of the outside layer, or they may be and they preferably will be set in from the ends of the outside layer, so that the ends of the counter shall be correspondingly thinner. By an inspection of Fig. 3 of the drawings illustrating diagrammatically a section of a counter provided with this additional intermediate layer of material it will be observed that it possesses all of the advantages above set forth in the description of the form of my invention illustrated in Figs. 1 and 2 and that in putting the parts of the counter together one of the lateral edges of the additional intermediate layer can always be located adjacent to one of the edges of either the second or third layers, which will serve as a guide or gage for placing the part in position.

The number of layers of material located between the outside and inside layers may vary without departure from my invention; but in any case such layers will always be capable of being laid together, using the layer underneath as a guide or gage for positioning the same, and the resulting counter, whether it embodies the additional intermediate layer or not, will have edges suitable for skiving without liability of cutting into the spaces at the edges of any of the intermediate layers.

To secure uniformity of thickness in the counters, I prefer to make the several layers of uniform thickness, respectively, and with my form of counter this can be done without the waste of stock otherwise necessarily incident thereto.

I am aware that it has been proposed to make counter-stiffeners for use in the manufacture of boots and shoes in which the outside layer conforms to the desired shape of the counter-stiffener and in which successive layers of material were laid thereon, each smaller than the preceding layer, until the inside layer was reached, which covered them all; but my invention is clearly differentiated therefrom and, among others, in the following respects: In the manufacture of a counter such as just referred to it would be practically impossible to obtain labor of the requisite skill and accuracy to lay up the successive layers in such accurate and correct position with relation to each other as to be able to produce counters of uniformity of size, thickness, and resiliency to meet the demands of the trade, in addition to which all such counters of which I am aware are open to the very serious objection that it is practically impossible to skive them in a uniform and satisfactory manner, because the openings at the succesive layers are so located as to intersect the lines of skiving, and thereby cause the edge of the counter to be irregular in form and with the corresponding liability of deformation in use.

Having thus described my invention, I claim as new and desire to secure by Letters Patent of the United States—

1. A counter-stiffener for use in the manufacture of boots and shoes, consisting of a plurality of layers of material, the outside layer being of the shape and size of the finished counter, two or more intermediate layers of material of the same size considerably narrower than the outside layer, one of such intermediate layers having its curved edge lying adjacent to the curved edge of the outside layer and another having its straight edge lying adjacent to the straight edge of the outside layer, and an inside layer of material covering the intermediate layers, the several layers being secured together, substantially as described.

2. A counter-stiffener for use in the manufacture of boots and shoes, consisting of a plurality of layers of material, the outside layer being of the shape and size of the finished counter, two or more intermediate layers of material of the same size slightly shorter and considerably narrower than the first layer, one of such intermediate layers having its curved edge lying adjacent to the curved edge of the outside layer and another having its straight edge lying adjacent to the straight edge of the outside layer, an inside layer of material slightly shorter and slightly narrower than the outside layer substantially covering the intermediate layers, and an additional intermediate layer of material considerably shorter and considerably narrower than the other intermediate layers of material located between the outside and inside layers, and having its edges adjacent to the edges of the other intermediate layers which are the more distant from the edges of the outside layer, the several layers being secured together, substantially as described.

In testimony whereof I affix my signature in presence of two witnesses.

WELCOME B. JOHNSON.

Witnesses:
HORACE VAN EVEREN,
ALFRED H. HILDRETH.